United States Patent [19]
Ohta et al.

[11] Patent Number: 5,041,520
[45] Date of Patent: Aug. 20, 1991

[54] PROCESS FOR PREPARING POLYIMIDE HAVING EXCELLENT HIGH TEMPERATURE STABILITY

[75] Inventors: Masahiro Ohta, Yokohama; Saburo Kawashima, Yokosuka; Katsuaki Iiyama, Odawara; Shoji Tamai; Hideaki Oikawa, both of Yokohama; Akihiro Yamaguchi, Kamakura, all of Japan

[73] Assignee: Mitsui Toatsu Chemicals, Inc., Tokyo, Japan

[21] Appl. No.: 371,072

[22] Filed: Jun. 26, 1989

[30] Foreign Application Priority Data

Jul. 5, 1988 [JP] Japan .................................. 63-167392
Nov. 15, 1988 [JP] Japan .................................. 63-286727

[51] Int. Cl.$^5$ .................... C08G 8/02; C08G 12/00; C08G 14/04; C08G 69/26
[52] U.S. Cl. ................................. 528/125; 528/126; 528/128; 528/229; 528/350; 528/353
[58] Field of Search ............... 528/125, 350, 353, 126, 528/128, 229

[56] References Cited

U.S. PATENT DOCUMENTS 3,528,950 9/1970 Lubowitz .......................... 528/229
4,742,153 5/1988 Sutton, Jr. ........................ 528/353

Primary Examiner—John Kight, III
Assistant Examiner—P. Hampton-Hightower
Attorney, Agent, or Firm—Burns, Doane, Swecker & Mathis

[57] ABSTRACT

Disclosed is a process for preparing a polyimide by reacting certain reactants. The reactants include an aromatic diamine which is 3,3'-diaminobenzophenone and/or bis(3-aminophenyl)sulfone, a tetrocarboxylic dianhydride and a dicarboxylic anhydride. A thermally stable polyimide can be obtained which displays excellent processability.

9 Claims, 3 Drawing Sheets

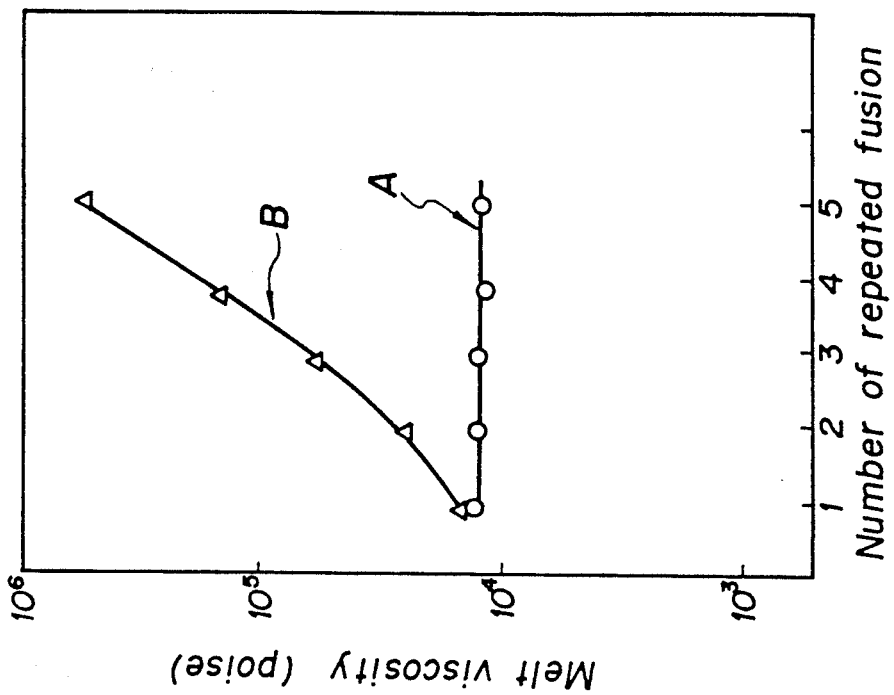
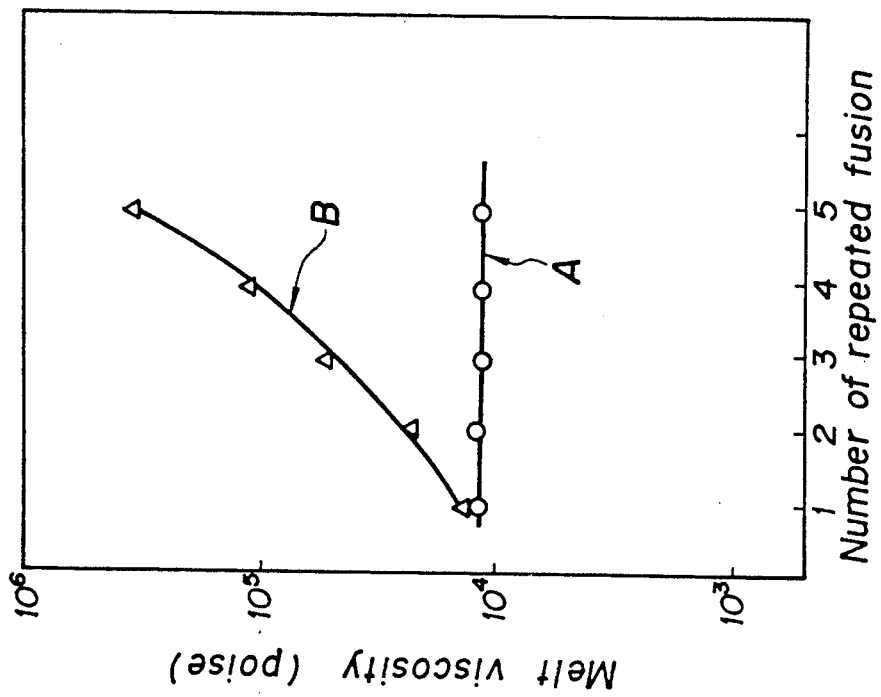

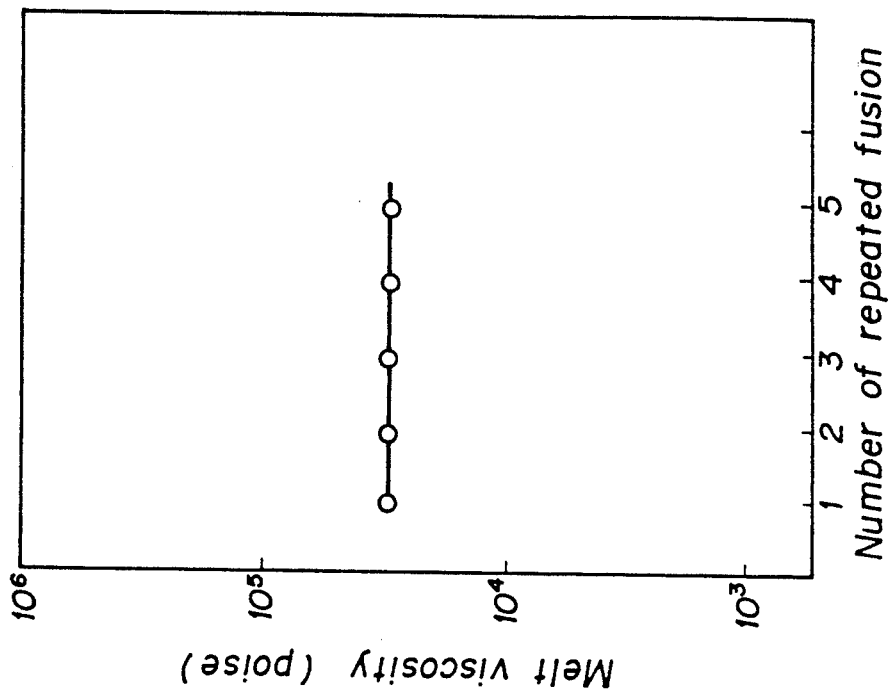
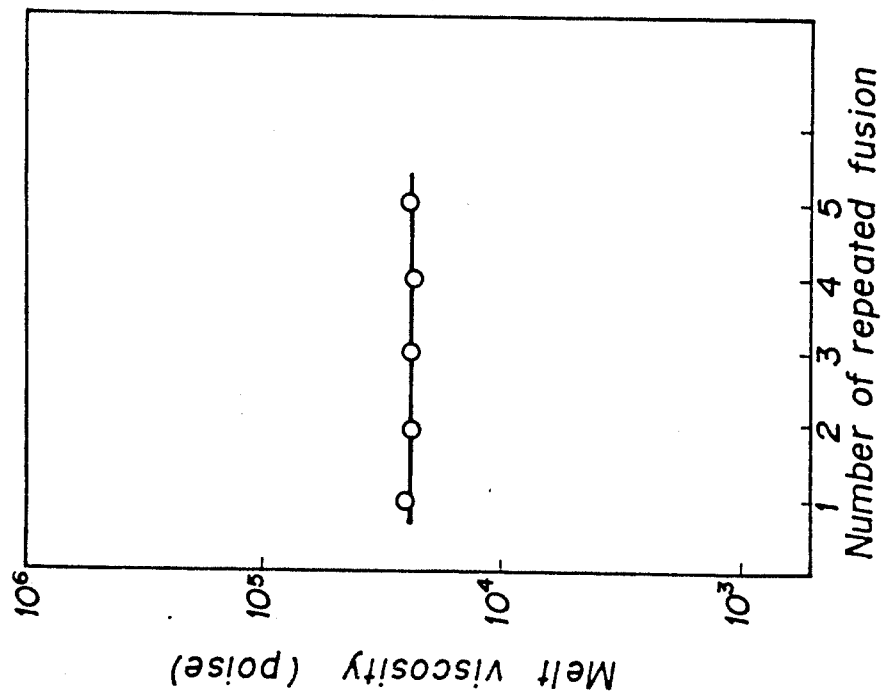

PROCESS FOR PREPARING POLYIMIDE HAVING EXCELLENT HIGH TEMPERATURE STABILITY

BACKGROUND OF THE INVENTION

The present invention relates to a process for preparing a polyimide that has excellent thermal stability and processability in a molten state.

Polyimide obtained by reacting tetracarboxylic dianhydride and aromatic diamine has excellent mechanical strength, dimensional stability, high temperature stability, flame resistance and electrical insulative properties. Such a polyimide has been used in electrical and electronic appliances space and aeronautical instruments and transport machinery. It is expected that it will also be used in applications where high-temperature resistance is required.

A variety of polyimides exhibiting excellent properties have been developed. Some polyimides, however, have no distinct glass transition temperature, although they are excellent in high-temperature stability. As a result, when employed as molding materials, specific methods such as sinter molding must be used for processing.

Other polyimides which are excellent in processability have low glass transition temperatures and are soluble in halogenated hydrocarbons, which renders these polyimides unsatisfactory for use in applications which require high-temperature stability and solvent resistance. Thus, these polyimides have numerous advantages and disadvantages.

D. J. Progar et al. have previously discovered a polyimide that is excellent in mechanical strength, thermal characteristics, electrical properties and solvent resistance and exhibits high-temperature stability. The polyimide consists primarily of recurring units of the formula (I) (U.S. Pat. No. 4,065,345);

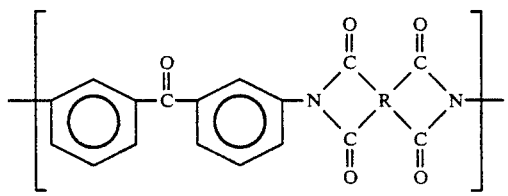

(I)

Furthermore, D. J. Progar et al. have previously discovered a polyimide that consists primarily of recurring units of the formula (II) (Int. J. Adhesion and Adhesive, 4, No. 2, 79~86, Apr. 1984);

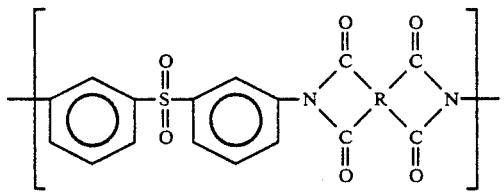

(II)

The polyimide is a high-temperature stable resin having many good properties.

Polyimides exhibit excellent flowability and good processability. The fused resin, however, gradually exhibits decreased flowability which has an adverse effect on processability when the polyimide is kept at high temperatures for a long period of time, for example, long residence at high temperature in a cylinder used in the injection molding.

Therefore, it is desirable to develop a polyimide which exhibits good flowability at lower temperatures and stable flowability for a long period of time during processing steps.

SUMMARY OF THE INVENTION

The present invention overcomes the problems and disadvantages of the prior art by providing a process for the preparation of a thermally stable polyimide.

An object of this invention is to provide a process for preparing an excellent polyimide which has, in addition to its substantial outstanding properties, good thermal stability in a molten state and which does not deteriorate with respect to processability even after exposure to high temperatures for a long period of time.

Additional objects and advantages of the invention will be set forth part in the description which follows, and in part will be obvious from the description or may be learned by practice of the invention. The objects and advantages of the invention will be realized and attained by means Of the instrumentalities and combinations, particularly pointed out in the appended claims.

BRIEF DESCRIPTION OF THE DRAWINGS

The accompanying drawings incorporated in and constitute a part of this specification, illustrate several exemplary embodiments of the invention and together with the description, serve to explain the principles of the invention.

FIGS. 1, 2, 5 and 6 illustrate the relationship between melt viscosity and number of repeated fusions.

DETAILED DESCRIPTION OF THE INVENTION

Figure 3:
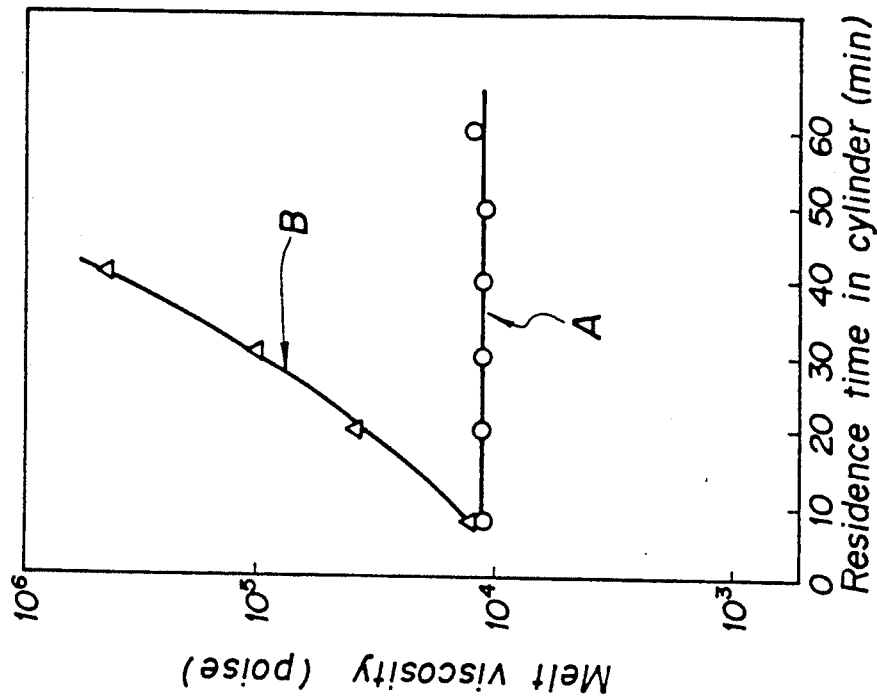
FIGS. 3 and 4 illustrate the relationship between melt viscosity and residence time of the polyimide in the cylinder of a flow tester.

The present invention relates to a process for preparing a thermally stable polyimide consisting essentially of recurring units of the formula(III):

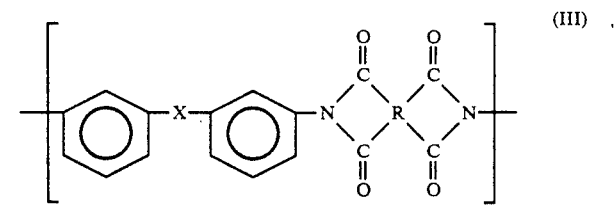

(III)

wherein X represents a carbonyl radical or a sulfonyl radical, R represents a tetravalent radical selected from the group consisting of an aliphatic radical having 2 or more carbon atoms, a cyclic aliphatic radical, a monocyclic aromatic radical, a fused polycyclic aromatic radical and a polycyclic aromatic radical wherein the aromatic rings are linked together directly or via a bridge member.

The process of the present invention comprises reacting; (a) an aromatic diamine represented by the formula (IV)

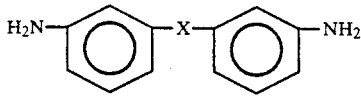

wherein X has the same meaning as set forth above.

(b) a tetracarboxylic dianhydride represented by the formula (V)

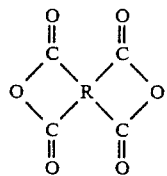

wherein R is as above defined.

(c) a dicarboxylic anhydride represented by the formula (VI)

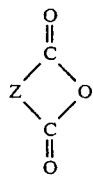

wherein Z represents a divalent radical selected from the group consisting of an aliphatic radical, a cyclic aliphatic radical, a monocyclic aromatic radical, a fused polycyclic aromatic radical, and a polycyclic aromatic radical wherein the aromatic radicals are linked to one another directly or via bridge member, to form a polyamic acid, and dehydrating or imidizing the polyamic acid to form a polyimide. Preferably, the molar ratio of the tetracarboxylic dianhydride is from about 0.9 to about 1.0 mole per mole of aromatic diamine. Preferably, the molar ratio of the dicarboxylic anhydride is from about 0.001 to about 1.0 mole per mole of aromatic diamine.

The aromatic diamines used in the process of this invention are 3,3'-diaminobenzophenone or bis (3-aminophenyl) sulfone. They may be used singly or in combination.

Other diamines may be used in the process of the invention as long as such diamines do not cause adverse effects on the properties of the polyimide produced by the process of this invention.

Exemplary other aromatic diamines include, m-phenylenediamine, o-phenylenediamine, p-phenylenediamine, m-aminobenzylamine, p-aminobenzylamine, bis(3-aminophenyl) ether, (3-aminophenyl)(4-aminophenyl) ether, bis(4-aminophenyl) ether, bis(3-aminophenyl) sulfide, (3-aminophenyl)(4-aminophenyl)sulfide, bis(4-aminophenyl)sulfide, bis(3-aminophenyl)sulfoxide, (3-aminophenyl)(4-aminophenyl)sulfoxide, bis(4-aminophenyl)sulfoxide, (3-aminophenyl)(4-aminophenyl) sulfone, bis(4-aminophenyl)sulfone, 3,4'-diaminobenzophenone, 4,4'-diaminobenzophenone, bis[4-(4-aminophenoxy)phenyl]methane, 1,1-bis[4-(4-aminophenoxy)phenyl]ethane, 1,2-bis[4-(4-aminophenoxy)phenyl]ethane, 2,2-bis[4-(4-aminophenoxy)phenyl]propane, 2,2-bis[4-(4-aminophenoxy)phenyl]butane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 4,4-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, bis[4-(4-aminophenoxy)phenyl]sulfone, bis[4-(3-aminophenoxy)phenyl]ether, bis[4-(4-aminophenoxy)phenyl]ether, 1,4-bis[4-(3-aminophenoxy)benzoyl]benzene, 1,3-bis[4-(3-aminophenoxy)benzoyl]benzene, bis[4-(3-aminophenoxy)phenyl]methane, 1,1-bis[4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)-3-methylphenyl]propane, 2,2-bis[4-(3-aminophenoxy)-3-methylphenyl]propane, 2-[4-(3-aminophenoxy)phenyl]-2-[4-(3-aminophenoxy)-3,5-dimethylphenyl]propane, 2-bis[4-(3-aminophenoxy)-3,5-dimethylphenyl]propane, 2,2-bis[4-(3-aminophenoxy)phenyl]butane, 2,2-bis[4-(3-aminophenoxy)phenyl]-1,1,1,3,3,3-hexafluoropropane, 4,4'-bis(3-aminophenoxy)biphenyl, 4,4'-bis(3-aminophenoxy)-3-methylbiph-enyl, 4,4'-bis(3-aminophenoxy)-3,3'-dimethylbiphenyl, 4,4'-bis(3-aminophenoxy)-3,5-dimethylbiph-enyl, 4,4'-bis(3-aminophenoxy)-3,3',5,5'-tetramethylbiphenyl, 4,4'-bis(3-aminophenoxy)-3,3'-dichlorobiph-enyl, 4,4'-bis(3-aminophenoxy)-3,5'-dichlorobiphenyl, 4,4'-bis(3-aminophenoxy)-3,3',5,5'-tetrachlorobiphenyl, 4,4'-bis(3-aminophenoxy)-3,3'-dibromobiphenyl, 4,4'-bis(3-aminophenoxy)-3,5-dibromobiphenyl, 4,4'-bis(3-aminophenoxy)-3,3',5,5'-tetrabromobiphenyl, bis[4-(3-aminophenoxy)phenyl]ketone, bis[4-(3-aminophenoxy)phenyl]sulfide, bis[4-(3-aminophenoxy)-3-methoxyphenyl]sulfide, 4-(3-aminophenoxy)phenyl][4-(3-aminophenoxy)-3,5-dimethoxyphenyl]sulfide, bis[4-(3-aminophenoxy)-3,5'-dimethoxyphenyl]sulfide,and bis[4-(3-aminophenoxy)phenyl]sulfone.

Exemplary tetracarboxylic dianhydrides which may be used in the process of this invention include, ethylenetetracarboxylic dianhydride, butanetetracarboxylic dianhydride, cyclopentanetetracarboxylic dianhydride, pyromellitic dianhydride, 1,1-bis(2,3-dicarboxyphenyl)ethane dianhydride, bis(2,3-dicarboxyphenyl)methane dianhydride, bis(3,4-dicarboxypenyl)methane dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, 2,2',3,3'-benzophenonetetracarboxylic dianhydride, 2,2',4,4'-biphenyltetracarboxylic dianhydride, 2,2',3,3'-biphenyltetracarboxylic dianhydride, bis(3,4-dicarboxyphenyl)ether dianhydride, bis(2,3-dicarboxyphenyl)ether dianhydride, bis(3,4-dicarboxy.phenyl)sulfone dianhydride, 4,4'-(p-phenylenedioxy)diphthalic dianhydride, 4,4'-(m-phenylenedioxy)diphthalic dianhydride, 2,3,6,7-naphthalenetetracarboxylic dianhydride, 1,4,5,8-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride.

The preferred tetracarboxylic dianhydride used in the process of this invention is 3,3',4,4'-benzophenonetetracarboxylic dianhydride.

The tetracarboxylic dianhydride may be used singly or in combination of two or more.

Exemplary dicarboxylic anhydrides which may be used in the method of this invention include, phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride.

The above mentioned dicarboxylic anhydride may be used singly or in combination.

Preferred molar ratios of the aromatic diamine, tetracarboxylic dianhydride and dicarboxylic anhydride are from about 0.9 to about 1.0 mole of tetracarboxylic dianhydride and from about 0.001 to about 1.0 mole of dicarboxylic anhydride per mole of aromatic diamine.

In preparing the polymide, the molar ratio of the aromatic diamine to the tetracarboxylic dianhydride is usually adjusted to control the molecular weight of the polyimide formed. In the method of this invention, when the molar ratio of the tetracarboxylic dianhydride to the aromatic diamine is in the range of from about 0.9 to about 1.0 ,polyimide having good melt viscosity is obtained.

The amount of dicarboxylic anhydride simultaneously present in the reaction mixture is preferably in the range of from about 0.001 to about 1.0 mole per mole of aromatic diamine. When the amount is less than 0.001 mole, heat stability in the molten state of the polyimide of this invention may not be obtained. When the molar ratio of dicarboxylic anhydride to the aromatic diamine is greater than 1.0 ,the mechanical properties of molded products are not as good. Most preferably the molar ratio of the dicarboxylic anhydride to the aromatic diamine is from about 0.01 to about 0.05 mole of dicarboxylic anhydride per mole of aromatic diamine.

Suitable organic solvents which may be used in the method of this invention include N,N-dimethylformamide, N,N-dimethylacetamide, N,N-diethylacetamide, N,N-dimethylmethoxyacetamide, N-methyl-2-pyrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, p-cresol, p-chlorophenol, xylenol and anisole. The organic solvents may be used singly or in combination.

In the method of this invention, the starting materials, e.g. the aromatic diamine, tetracarboxylic dianhydride and dicarboxylic anhydride are added to the organic solvent and reacted. The reaction can be carried out by any of the following methods.

(a) After reacting aromatic diamine with tetracarboxylic dianhydride, dicarboxylic anhydride is added and reacted.

(b) After reacting aromatic diamine with dicarboxylic anhydride, tetracarboxylic dianhydride is added and reacted.

(c) Aromatic diamine, tetracarboxylic dianhydride and dicarboxylic anhydride are reacted at the same time.

The reaction temperature is preferably in the range of from about 0 to about 250° C. and most preferably from about 0° to about 60°.

Any reaction pressure may be used and ambient pressure is sufficient to carry out the reaction.

The reaction time is dependent upon the aromatic diamine, tetracarboxylic dianhydride, dicarboxylic anhydride, solvent and reaction temperature. Preferably, the reaction time is from about 4 to about 24 hours.

Polyamic acid is formed by the above mentioned reaction. The resultant polyamic acid is dehydrated by heating at from about 100 to about 400° C. or chemically imidized by using a usual imidizing agent.

The polyimide obtained consists primarily of recurring units of the formula (III):

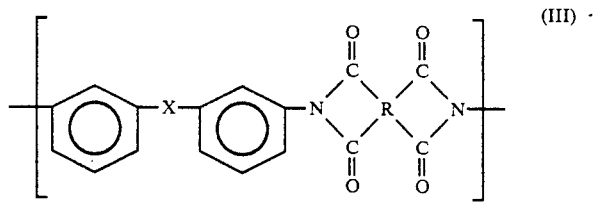

wherein, X and R are as above defined.

The polyamic acid is generally formed at low temperatures and then thermally or chemically imidized. The polyimide, however, can also be obtained by simultaneously conducting the formation and thermal imidization of the polyamic acid at a temperature of from about 60 to about 250° C. In this method, an aromatic diamine, tetracarboxylic dianhydride and dicarboxylic anhydride are suspended or dissolved in an organic solvent and reacted by heating. Thus, the formation and imidization of the polyamic acid are carried out at the same time and produce a polyimide consisting primarily of the recurring units of the above formula.

When the polyimide of this invention is processed by fusion molding, other thermoplastic resins may be incorporated in suitable amounts depending upon the application so long as no adverse effects occur contrary to the objects of this invention. Illustrative examples of thermoplastic resins which may be used with the polyimide include polyethylene, polypropylene, polycarbonate, polyarylate, polyamide, polysulfone, polyethersulfone, polyetherketone, polyphenylenesulfide, polyamideimide, polyetherimide and modified polyphenyleneoxide.

Fillers which are used for usual resin compositions may be employed in an amounts which has no adverse effects on the objects of this invention. Suitable fillers which may be used include, wear resistance improvers such as graphite, carborundum, quartz powder, molybdenum disulfide and fluororesins; reinforcing materials such as glass fiber, carbon fiber, boron fiber, silicon carbide fiber, carbon whisker, asbestos, metal fiber and ceramic fiber; flame retardants such as antimony trioxide, magnesium carbonate and calcium carbonate;electrical property improvers such as clay and mica; tracking resistance improvers such as barium sulfate, silica and calcium metasilicate; thermal conductivity improvers such as iron powder, zinc powder, aluminum powder and copper powder; and other miscellaneous additives such as glass beads, glass spheres, talc, diatomaceous earth, alumina, silicate balloon, hydrated alumina, metal oxides and coloring agents.

EXAMPLES

The present invention will be further classified by the following examples which are intended to be purely exemplary of the invention.

Example 1

To a reaction vessel equipped with a stirrer, reflux condenser and nitrogen inlet tube, 212 g (1.0 mole) of 3,3'-diaminobenzophenone and 2,970 g of N,N-dimethylacetamide as a solvent were charged. Then 312 g (0.97 mole) of 3,3',4,4'-benzophenonetetracarboxylic dianhydride were added by portions at room temperature in a nitrogen atmosphere so as not to raise the temperature of the solution and were stirred for about 20 hours at the room temperature.

To the polyamic acid solution thus obtained 22.2g(0.15 mole) of phthalic anhydride were added at room temperature in anitrogen atmosphere and further stirred for an hour. Then 202 g (2 moles) of triethylamine and 306 g (3 moles) of acetic anhydride were added dropwise to the solution. Yellow polyimide powder started to precipitate after about one hour from the completion of dropwise addition. The reaction mixture was further stirred for 10 hours at the room temperature. The resultant slurry was filtered, washed with methanol and dried at 180° C. for 2 hours.

The amount of Polyimide powder obtained was 487 g. The polyimide powder had a glass transition temperature of 250° C., a melting point of 298° C. by DSC method and an inherent viscosity of 0.52 viscosity was measured at 35° C. in a solvent mixture (90/10 weight ratio of p-chlorophenol/phenol) at a concentration of 0.5 g/100 ml solvent The melt viscosity of the polyimide powder thus obtained was repeatedly measured using a Japan polymer Society type flowtester (Trade mark, CFT-500; a product of Shimazu Seisakusho Co.) with an orifice having diameter of 0.1 cm and a length of 1 cm. After being kept at 380° C. for minutes, the sample was extruded with a pressure of 100 kg/cm$^2$. The strand obtained was crushed and extruded again. The procedure was continuously repeated 5 times.

The relationship between the repetation number and the melt viscosity is illustrated by curve A in FIG. 1.

Almost no variation is found in the melt viscosity even though number of repetitions is increased, which indicates good heat stability of the molten polyamide.

Comparative Example 1

The same procedure as described in Example 1 was carried out without using phthalic anhydride. The amount of polyimide powder obtained was 464g and the polyimide had an inherent viscosity of 0.52 dl/g.

The repeated measurement of the melt viscosity was carried out on the polyimide powder thus obtained by the method described in Example 1.

The results are illustrated by Curve B in FIG. 1.

The melt viscosity increased with an increase of in the number of repetitions.

The heat stability of the molten polyimide thus obtained was inferior to that obtained in Example 1.

Example 2

To the same reaction vessel as described in Example 1, 248g (1.0 mole)of bis(3-aminophenyl)sulfone and 3.170 g of N,N-dimethylacetamide as a solvent were charged. Then 312 g (0.97 mole) of 3,3',4,4'-benzophenonetetracarboxylic dianhydride were added by portions at room temperature in a nitrogen atmosphere so as not to raise the temperature of the solution and stirred for about 20 hours at room temperature.

To the polyamic acid solution thus obtained, 22.2 g (0.15mole) of phthalic anhydride were added at room temperature in a nitrogen atmosphere and further stirred for one hour. Then 202 g (2 moles) of triethylamine and 306 g (3 moles) of acetic anhydride were added dropwise to the solution. Yellow polyimide powder started to precipitate after about one hour from the completion of dropwise addition. The reaction mixture was further stirred for 10 hours at room temperature. The resultant slurry was filtered, washed with methanol and dried at 180° C. for 2 hours. The amount of polyimide powder obtained was 522 g.

The polyimide powder had a glass transition temperature of 269° C., and an inherent viscosity of 0.51 dl/g.

The melt viscosity of the polyimide powder thus obtained was repeatedly measured by the method described in Example 1. The relationship between the repetition number and the melt viscosity did not vary even though repetition number is increased, which indicates good heat stability of the molten polyimide.

Comparative Example 2

The same procedure as described in Example 2 was carried out without phthalic anhydride. The amount of polyimide powder obtained was 496 g and the polyimide had an inherent viscosity of 0.52 dl/g.

The repeated measurement of the melt viscosity was carried out on the polyimide powder thus obtained by the method described in Example 2.

The results are illustrated by Curve B in FIG. 2. The melt viscosity increased with an increase in the number of repetitions. The heat stability of the molten polyimide thus obtained was inferior obtained in Example 2.

Example 3

To the same reaction vessel as described in Example 1, 212 g (1.0 mole) of 3,3'-diaminobenzophenone and 2,970 g of N,N-dimethylacetamide as a solvent were charged. Then 8.88 g (0.06 mole) of phthalic anhydride and 312 g (0.97 mole) of 3,3',4,4'-benzophenonetetracarboxylic dianhydride were added at room temperature in a nitrogen atmosphere so as not to raise the temperature of the solution and stirred for 20 hours at the room temperature. Then 202 g (2 moles) of triethylamine and 306 g (3 moles) of acetic anhydride were added dropwise to the solution. The reaction mixture was stirred for 20 hours at room temperature. The resultant light yellow slurry was filtered, washed with methanol and dried at 180° C. for 8 hours under reduced pressure. The amount of light yellow polyimide powder thus obtained was 458 g. The polyimide powder had a glass transition temperature of 250° C., melting point of 298° C. and an inherent viscosity of 0.50 dl/g.

The heat stability of the molten polyimide was evaluated by measuring the variation of melt viscosity when the residence time of the molten polyimide was changed in the cylinder of the flow tester. The cylinder temperature was 380° C. The pressure at the measurement was 100 kg/cm$^2$. The results are illustrated by Curve A in FIG. 3. Almost no variation was found in the melt viscosity even though the residence time was extended, which indicates good heat stability of the molten polyimide.

Comparative Example 3

The same procedure as described in Example 3 was carried out without phthalic anhydride.

The light yellow polyimide powder thus obtained had a glass transition temperature of 250° C. and an inherent viscosity of 0.50 dl/g.

The heat stability of the molten polyimide was evaluated by the method described in Example 3. The melt viscosity increased with an increase in residence time. The heat stability of the molten polyimide thus obtained was inferior to that obtained in Example 3. The results are illustrated by Curve B in FIG. 3.

Example 4

To the same reaction vessel as described in Example 1, 212 g (1.0 mole) of bis(3-aminophenyl)sulfone and 3,170 g of N,N-dimethylacetamide as a solvent were charged. Then 8.88 g (0.06mole) of phthalic anhydride and 312 g (0.97 mole) of 3,3',4,4'-benzophenonetetracarboxylic dianhydride were added at room temperature in a nitrogen atmosphere so as not to raise the temperature of the solution and stirred for 20 hours at room temperature.

The 202 g (2 moles) of triethylamine and 306 g (3 moles) of acetic anhydride were added dropwise to the solution. The reaction mixture was stirred for 20 hours at room temperature. The resultant light yellow slurry was filtered, washed with methanol and dried at 180° C. for 8 hours under reduced pressure. The amount of light yellow polyimide powder thus obtained was 521 g. The polyimide powder had a glass transition temperature of 269° C. and an inherent viscosity of 0.50 dl/g.

The heat stability of the molten polyimide was evaluated by measuring the variation of melt viscosity when the residence time of the molten polyimide is changed in the cylinder of the flow tester. The cylinder temperature was 380° C. The pressure at the measurement was 100 kg/cm$^2$. The results are illustrated by Curve A in FIG. 4. Almost no variation is found in the melt viscosity even though the residence time is extended, which indicates good heat stability of the molten polyimide.

Comparative Example 4

The same procedure as described in Example 4 was carried out without phthalic anhydride.

The light yellow polyimide powder thus obtained had a glass transition temperature of 296° C., and an inherent viscosity of 0.50 dl/g.

The heat stability of the molten polyimide was evaluated by the method described in Example 4. The melt viscosity increased with an increase in residence time. The heat stability of the molten polyimide thus obtained was inferior to that obtained in Example 4.

Figure 4:
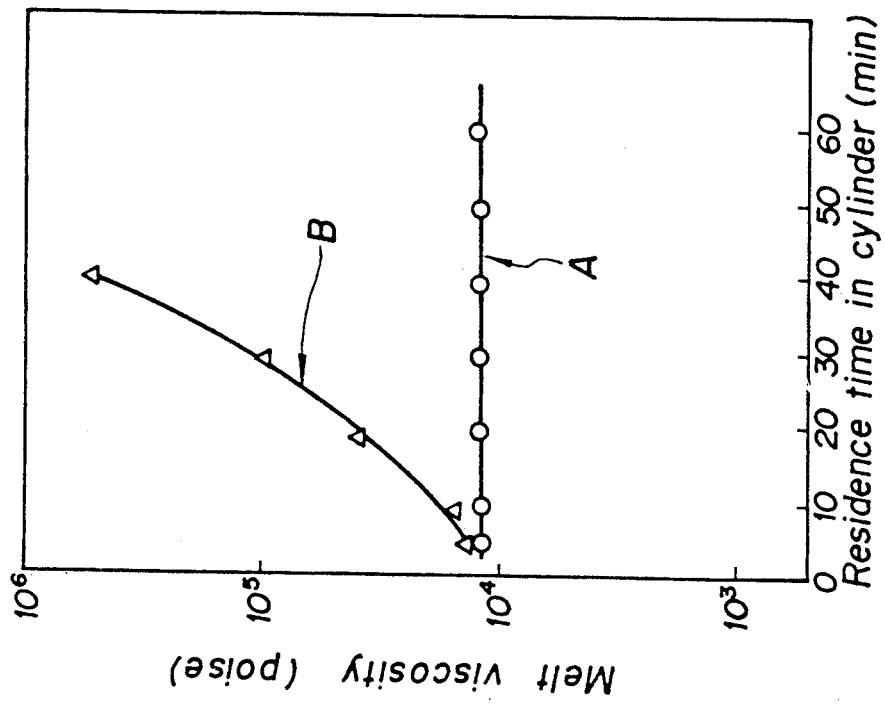

The results are illustrated by Curve B of FIG. 4.

Example 5

To the same reaction vessel as described in Example 1, 212 g (1.0 mole) of 3,3'-diaminobenzophenone, 315.6 g (0.98 mole) of 3,3',4,4'-benzophenonetetracarboxylic dianhydride, 5.92 g (0.04 mole) of Phthalic anhydride and 2,970 g of m-cresol were charged and gradually heated with stirring in a nitrogen atmosphere. A brown transparent homogeneous solution was obtained at about 120° C. The solution was heated to 150° C. Yellow polyimide powder started to precipitate after stirring for about 20 minutes at this temperature.

After stirring the reaction mixture for an additional 2 hours at 150° C., the precipitate was filtered, washed with methanol and then acetone, and dried at 180° C. for 8 hours under reduced pressure. The amount of polyimide powder thus obtained was 485 g and the polyimide had an inherent viscosity of 0.57 dl/g, and a glass transition temperature of 215° C. The repeated measurement of the melt viscosity was carried out on the polyimide powder thus obtained by the method described in Example 1. The temperature at the measurement was 400° C. The pressure at the measurement was 100 kg/cm$^2$. The results obtained are illustrated by FIG. 5. Almost no variation is found in the melt viscosity even though the number of repetitions is increased, which indicates good heat stability of the molten polyimide.

Example 6

To the same reaction vessel as described in Example 1, 248 g (1.0 mole)of bis(3-aminophenyl)sulfone, 315.6 g (0.97 mole) of 3,3',4,4'-benzophenonetetracarboxylic dianhydride, 5.92 g (0.04 mole) of phthalic anhydride and 3,170 g of m-cresol were charged and gradually heated with stirring in a nitrogen atmosphere. A brown transparent homogeneous solution was obtained at about 120° C. The solution was heated to 150° C. Yellow polyimide powder was started to precipitate after stirring for about 20 minutes at this temperature. After stirring the reaction mixture for 2 further hours at temperature, the precipitate was filtered, washed with methanol and then acetone, and dried at 180° C. for 8 hours under reduced pressure. The amount of polyimide powder thus obtained was 520 g and the polyimide had an inherent viscosity of 0.56 dl/g and a glass transition temperature of 270° C.

The repeated measurement of the melt viscosity was carried out on the polyimide powder thus obtained by the method described in Example 1.

The temperature at the measurement was 400° C. The pressure at the measurement was 100 kg/cm$^2$. The results obtained are illustrated by FIG. 6. Almost no variation is found in the melt viscosity even though the number of repretitions is increased, which indicates good heat stability of the molten polyimide.

What is claimed is:

1. A process for preparing a polyimide comprising reacting
   (a) an aromatic diamine represented by the formula (IV):

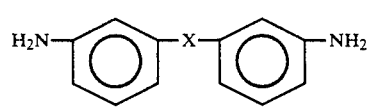

(IV)

wherein X represents a carbonyl radical or a sulfonyl radical,
(b) at least one tetracarboxylic dianhydride represented by the formula (V):

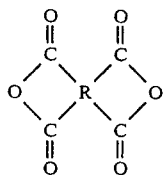

wherein R represents a tetravalent radical selected from the group consisting of an aliphatic radical having at least two carbon atoms, a cyclic aliphatic radical, a monocyclic aromatic radical, a fused polycyclic aromatic radical, a polycyclic aromatic radical wherein he aromatic rings are linked together directly or via a bridge member; and (c) the reaction is carried out in the presence of dicarboxylic anhydride represented by the formula (VI):

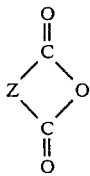

wherein Z represents a divalent radical selected from the group consisting of an aliphatic radical, cyclic aliphatic radical, monocyclic aromatic radical, fused polycyclic aromatic radical, and polycyclic aromatic radical wherein the aromatic radicals are linked to one another directly or via bridge member; to form a polyamic acid; and dehydrating or imidizing said polyamic acid to form a polyimide wherein the molar ratio of said tetracarboxylic dianhydride to said aromatic diamine is from about 0.9 to about 1.0 mole of tetracarboxylic dianhydride per mole of aromatic diamine and the molar ratio of said dicarboxylic anhydride to said aromatic diamine is from about 0.001 to about 1.0 of dicarboxylic anhydride per mole of aromatic diamine.

2. The process of claim 1 wherein said molar ratio is form about 0.01 to about 0.5 mole of dicarboxylic anhydride per mole of aromatic diamine.

3. The process of claim 1 wherein the molar ratio of said dicarboxylic anhydride to said aromatic diamine is from about 0.001 to about 1.0 mole of dicarboxylic anhydride per mole of aromatic diamine.

4. The process of claim 1 wherein said tetracarboxylic dianhydride is 3,3',4,4'-benzophenonetetracarboxylic dianhydride.

5. The process of claim 4 wherein said dicarboxylic anhydride is phthalic anhydride.

6. The process of claim 1 wherein the reaction temperature is from about 0° C. to about 250° C.

7. The process of claim 6 wherein the reaction temperature is no greater than about 60° C.

8. The process of claim 1 wherein the reaction time is from about 4 hours to about 24 hours.

9. The process of claim 1 wherein said polyamic acid is dehydrated by heating at a temperature of from about 100° C. to about 400° C.

* * * * *

UNITED STATES PATENT AND TRADEMARK OFFICE
CERTIFICATE OF CORRECTION

PATENT NO. : 5,041,520

DATED : August 20, 1991

INVENTOR(S) : OHTA ET AL.

It is certified that error appears in the above-identified patent and that said Letters Patent is hereby corrected as shown below:

In column 11, line 15, amend "he" to --the--; and

In column 12, line 9, after "1.0" insert --mole--.

Signed and Sealed this

Sixth Day of April, 1993

Attest:

STEPHEN G. KUNIN

*Attesting Officer*   Acting Commissioner of Patents and Trademarks